United States Patent
Ahn et al.

(10) Patent No.: US 12,467,035 B2
(45) Date of Patent: *Nov. 11, 2025

(54) METHOD OF DIFFERENTIATING MESENCHYMAL STEM CELLS INTO CARDIOMYOCYTES

(71) Applicant: CHONNAM NATIONAL UNIVERSITY HOSPITAL, Gwangju (KR)

(72) Inventors: Youngkeun Ahn, Gwangju (KR); Yong Sook Kim, Gwangju (KR); Hye Jin Kang, Gwangju (KR); Dong Im Cho, Gwangju (KR)

(73) Assignee: CHONNAM NATIONAL UNIVERSITY HOSPITAL, Gwangju (KR)

( * ) Notice: Subject to any disclaimer, the term of this patent is extended or adjusted under 35 U.S.C. 154(b) by 216 days.

This patent is subject to a terminal disclaimer.

(21) Appl. No.: 15/854,017

(22) Filed: Dec. 26, 2017

(65) Prior Publication Data

US 2018/0201903 A1 Jul. 19, 2018

(30) Foreign Application Priority Data

Dec. 27, 2016 (KR) .................. 10-2016-0179624

(51) Int. Cl.
*C12N 5/077* (2010.01)
*A61K 35/34* (2015.01)

(52) U.S. Cl.
CPC ............ *C12N 5/0657* (2013.01); *A61K 35/34* (2013.01); *C12N 2500/30* (2013.01); *C12N 2500/34* (2013.01); *C12N 2501/065* (2013.01); *C12N 2501/999* (2013.01); *C12N 2506/1353* (2013.01); *C12N 2510/00* (2013.01)

(58) Field of Classification Search
CPC .......... C12N 5/0657; C12N 2506/1353; A61K 35/34
See application file for complete search history.

(56) References Cited

U.S. PATENT DOCUMENTS

| | | | |
|---|---|---|---|
| 2009/0130064 A1* | 5/2009 | Rogiers .................. | C12N 5/067 424/93.7 |
| 2009/0162329 A1 | 6/2009 | Anversa et al. | |
| 2011/0097799 A1* | 4/2011 | Stankewicz ............... | A61P 9/04 435/377 |
| 2013/0029368 A1* | 1/2013 | Kattman .............. | C12N 5/0657 435/26 |
| 2014/0134733 A1 | 5/2014 | Wu et al. | |

FOREIGN PATENT DOCUMENTS

EP  1983042 A1 * 10/2008 ............... C12N 5/00

OTHER PUBLICATIONS

Bush et al., "Protein Acetylation in the Cardiorenal Axis the Promise of Histone Deacetylase Inhibitors", Circulation Research, 2010, vol. 106, pp. 272-284 (Year: 2010).*
Han et al., ".Apicidin, a Histone Deacetylase Inhibitor, Inhibits Proliferation of Tumor Cells via Induction of p21WAF1/Cip1 and Gelsolin", Cancer Research, 2000, vol. 60, pp. 6068-3074. (Year: 2000).*
Drugs@FDA Glossery of Terms , 2017, definition for "active ingredient", https://www.fda.gov/drugs/drug-approvals-and-databases/drugsfda-glossary-terms#:~:text=An%20active%20ingredient%20is%20any,body%20of%20man%20or%20animals. (Year: 2017).*
Chang, et al., "Proarrhythmic Potential of Mesenchymal Stem Cell Transplantation Revealed in an In Vitro Coculture Model," Circulation, 113:1832-1841, 2006.
Segers, et al., "Stem-cell therapy for cardiac disease," Nature, 451:937-942, 2008.
Lu et al., "Downregulation of HDAC1 Is Involved in the Cardiomyocyte Differentiation from Mesenchymal Stem Cells in a Myocardial Microenvironment," PLoS One, 9(4):e93222, 2014.

* cited by examiner

*Primary Examiner* — Laura Schuberg
(74) *Attorney, Agent, or Firm* — Riverside Law LLP (57) ABSTRACT

The present invention relates to a method of differentiating mesenchymal stem cells into cardiomyocytes. When the method of the present invention is used, cardiomyocytes may be obtained from mesenchymal stem cells with high efficiency. Therefore, the method of the present invention may be effectively used for treatment of heart diseases, such as heart failure, which require myocardial regeneration for treatment.

5 Claims, 6 Drawing Sheets

Human bone marrow-derived MSC
Glucose-free DMEM
Glucose-free Glutamine-free DMEM
Apicidin 3 μM
Lactate 12 mM

MSCs in infarcted heart tissue

Glc(-)/AC-MSCs in infarcted heart tissue

METHOD OF DIFFERENTIATING MESENCHYMAL STEM CELLS INTO CARDIOMYOCYTES

STATEMENT REGARDING FEDERALLY SPONSORED RESEARCH OR DEVELOPMENT

The present invention was undertaken with the support of application of multi-functional cardiovascular therapeutics using integration analysis of diseased niche No. 2015M3A9B4051063 grant funded by the Ministry of Health and Welfare.

CROSS-REFERENCE TO RELATED APPLICATION

This application claims priority to and the benefit of Korean Patent Application No. 10-2016-0179624, filed on Dec. 27, 2016, the disclosure of which is incorporated herein by reference in its entirety.

BACKGROUND

1. Field of the Invention

The present invention relates to a method of differentiating mesenchymal stem cells into cardiomyocytes, and more particularly, to a method of differentiating mesenchymal stem cells into cardiomyocytes by culturing mesenchymal stem cells in a medium containing apicidin under glucose deprivation conditions.

2. Discussion of Related Art

Stem cells have the ability to continuously produce the same cells as themselves for a certain period of time in an undifferentiated state and have the ability to differentiate into specialized cells under specific conditions.

Stem cells can be classified into embryonic stem cells and adult stem cells depending on the differentiation ability and generation time thereof. Although human embryonic stem cells have many ethical problems because they are derived from embryos that can develop into humans, human embryonic stem cells are known to have superior cell proliferation and differentiation ability compared to adult stem cells. Adult stem cells can be obtained from bone marrow, blood, the brain, skin, and the like, and have few ethical problems, but have limited differentiation ability compared to embryonic stem cells.

Representative adult stem cells include hematopoietic stem cells (HSCs) and mesenchymal stem cells (MSCs). It has been known that hematopoietic stem cells mainly differentiate into blood cells present in the blood, such as red blood cells, white blood cells, and platelets, whereas mesenchymal stem cells differentiate into mesodermal tissue cells, such as chondrocytes, osteocytes, adipocytes, myocytes, and nerve cells. As methods of isolating and culturing adult stem cells have been known, there is increasing clinical interest in applying adult stem cells as a cell therapeutic agent. When cells are destroyed by neurodegenerative diseases, including Parkinson's disease and Alzheimer's disease, or diseases, including quadriplegia caused by spinal cord injuries, liver cirrhosis, childhood diabetes, leukemia, and other chronic diseases, cell replacement therapies using stem cells have been proposed as an effective treatment method. According to cell replacement therapies, cells differentiated from stem cells are administered to replace deficient cells. Therefore, many studies on cell replacement therapies are underway.

Meanwhile, one major problem in the study of differentiation of embryonic stem cells into cardiomyocytes is complete separation of undifferentiated stem cells from differentiated cardiomyocytes. When transplants are performed without completely removing undifferentiated embryonic stem cells from differentiated cells, undifferentiated embryonic stem cells may cause fatal disorders such as tumors in vivo.

The characteristics of energy metabolism are very different depending on cell types such as undifferentiated cells, proliferating cells, differentiated cells, and cancer cells. Accordingly, various studies have been conducted to separate differentiated cells/undifferentiated embryonic stem cells, and studies using the characteristics of intracellular glucose metabolism have been reported. In the case of undifferentiated embryonic stem cells, proliferative activity is very high, so that glucose decomposed in the cells is converted into cellular constituents besides ATP and the cellular constituents are used for cell proliferation. On the other hand, in the case of differentiated cells, glucose is mainly used for ATP production through the citric acid cycle, and thus much more ATP is produced in differentiated cells compared to embryonic stem cells.

Meanwhile, cardiomyocytes have very low proliferative activity, and glucose is metabolized through the citric acid cycle in cardiomyocytes. When glucose is deficient in cardiomyocytes, a variety of non-glucose carbon sources are converted into intermediates in the citric acid cycle, or lactic acid is used as a carbon source. On the other hand, undifferentiated cells having high proliferation activity cannot use lactic acid as a carbon source.

A number of different cell types have been considered as candidates for stem cell therapies to treat heart disease, but an ideal cell type has not been found yet (Segers, V. F. & Lee, R. T. Nature 451, 937-942 (2008)). In fact, differentiation of mesenchymal stem cells into cardiomyocytes is observed at a very low rate in vivo, and it is uncertain whether transplanted stem cells can be electromechanically integrated with cardiac muscle (Chang, M. G., et al. Circulation 113, 1832-1841 (2006)). Therefore, research is needed to find a method of efficiently differentiating mesenchymal stem cells into cardiomyocytes.

SUMMARY OF THE INVENTION

The present invention was made to solve the conventional technical problems described above. The present inventors studied a method of differentiating mesenchymal stem cells into cardiomyocytes, and found that expression of cardiomyocyte-specific genes was significantly increased when mesenchymal stem cells were treated with apicidin under glucose deprivation conditions, thus completing the present invention.

Therefore, it is an objective of the present invention to provide a method of inducing differentiation of mesenchymal stem cells into cardiomyocytes, the method including a step of treating mesenchymal stem cells with apicidin under glucose deprivation conditions.

It is another objective of the present invention to provide a composition for inducing differentiation of mesenchymal stem cells into cardiomyocytes, not containing glucose and containing apicidin.

However, the technical problems to be solved by the present invention are not limited to the above-mentioned problems, and other challenges not mentioned can be clearly understood by those skilled in the art from the following description.

In accordance with the present invention, the above and other objectives can be accomplished by the provision of a method of inducing differentiation of mesenchymal stem cells into cardiomyocytes, the method including a step of treating mesenchymal stem cells with apicidin under glucose deprivation conditions.

In one embodiment of the present invention, the mesenchymal stem cells may be obtained from bone marrow, tissue, embryos, cord blood, blood or bodily fluids.

In another embodiment of the present invention, the step of treating mesenchymal stem cells with apicidin may be performed by culturing mesenchymal stem cells in a medium containing apicidin, and the medium may further contain lactic acid.

In another embodiment of the present invention, the culture may be performed for 4 to 20 hours.

In another embodiment of the present invention, expression of cardiomyocyte-specific markers may be increased in cardiomyocytes compared to mesenchymal stem cells.

In another embodiment of the present invention, the cardiomyocyte-specific marker may be GATA4, Nkx2.5, cardiac troponin I (cTnI), cardiac troponin T (cTnT), a myosin light chain (MLC), a myosin heavy chain (MHC) or connexin 43 (Cx43).

In accordance with an aspect of the present invention, the above and other objectives can be accomplished by the provision of a composition for inducing differentiation of mesenchymal stem cells into cardiomyocytes, not containing glucose and containing apicidin.

In accordance with another aspect of the present invention, there is provided a cell therapeutic agent for treating cardiovascular diseases, including cardiomyocytes differentiated from mesenchymal stem cells by the method.

In one embodiment of the present invention, the cardiovascular diseases may be angina pectoris, myocardial infarction, ischemic heart diseases, hyperlipidemia, stroke, arteriosclerosis, hypertension, arrhythmia, cerebrovascular diseases or coronary artery diseases.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Based on the finding that, when mesenchymal stem cells are cultured in a medium containing apicidin under glucose deprivation conditions, the expression of cardiomyocyte-specific genes is increased. Mesenchymal stem cells were cultured in a glucose-free medium, a medium containing apicidin or a medium containing apicidin and lactic acid, and the survival rate of mesenchymal stem cells, the expression levels of cardiomyocyte-specific genes, and the like were confirmed over time. On the obtained results, the present invention was completed.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

The present invention provides a method of inducing differentiation of mesenchymal stem cells into cardiomyocytes, the method including a step of treating mesenchymal stem cells with apicidin under glucose deprivation conditions.

In the present invention, "apicidin" is a compound having a structure represented by Compound 1 below, and may be isolated from natural products or artificially synthesized. It will be apparent to those skilled in the art that, even when apicidin is artificially synthesized, it has the same effect as apicidin obtained from natural products.

[Compound 1]

In the present invention, the type of mesenchymal stem cells used for inducing differentiation into cardiomyocytes is not particularly limited. Mesenchymal stem cells may be obtained from known mesenchymal stem cell sources, such as bone marrow, tissue, embryos, cord blood, blood or bodily fluids. Animals from which bone marrow, tissue, and the like are obtained may be mammals. When the animal is a human, bone marrow, tissue, and the like may be derived from a patient who will be administered cardiomyocytes differentiated from mesenchymal stem cells by treatment of the composition of the present invention, or may be derived from another person. Methods of obtaining mesenchymal stem cells from such known mesenchymal stem cell sources are well known in the art.

In the present invention, "medium" refers to a mixture for growth and proliferation of cells such as stem cells in vitro, the mixture containing essential elements for cell growth and proliferation, such as sugars, amino acids, various nutrients, serum, growth factors, and minerals.

Various media are commercially available in the art and may be artificially prepared and used. Examples of commercially available media include Dulbecco's Modified Eagle's Medium (DMEM), Minimal Essential Medium (MEM), Basal Medium Eagle (BME), RPMI 1640, F-10, F-12, DMEM F-12, α-Minimal Essential Medium (α-MEM), Glasgow's Minimal Essential Medium (G-MEM), Iscove's Modified Dulbecco's Medium (IMPM), AmnioMax, AminoMax II complete Medium (Gibco, New York, USA), Chang's Medium MesemCult-XF Medium (STEMCELL Technologies, Vancouver, Canada), and the like. In addition to a medium that may be artificially prepared, a commercially available medium may be used as a basic medium used in the present invention.

The medium composition of the present invention may be prepared by adding apicidin to a medium not containing glucose and glutamine, which is a medium specific for mesenchymal stem cell culture, and lactic acid may be further added thereto. In addition, the medium not containing glucose and glutamine may be exemplified by A14430 (ThermoFisher Scientific), without being limited thereto.

In the medium composition for culturing mesenchymal stem cells of the present invention, apicidin is contained at a concentration of 1 to 100 μM, preferably 1 to 10 μM, more preferably 1 to 3 μM. When the concentration of apicidin is too low, the effect of apicidin may be insignificant, and when the concentration of apicidin is too high, cytotoxicity may be induced. Therefore, depending on cell types, apicidin should be used at an appropriate concentration.

Considering the time generally required for inducing differentiation of mesenchymal stem cells, incubation in a medium containing apicidin may be performed for 4 to 20 hours, without being limited thereto. The duration of treatment of mesenchymal stem cells with apicidin may vary depending on whether glucose is included or lactic acid is additionally included.

In the present invention, "cardiomyocytes" include both cardiomyocytes differentiated from mesenchymal stem cells and cells undergoing differentiation into cardiomyocytes. In the present invention, cardiomyocytes differentiated from mesenchymal stem cells by treatment with apicidin exhibit the expression of cardiomyocyte-specific markers. In cardiomyocytes obtained according to the method of the present invention, the expression of cardiomyocyte-specific markers may be increased compared to mesenchymal stem cells. The cardiomyocyte-specific markers may be selected from the group consisting of GATA4, Nkx2.5, cardiac troponin I (cTnI), cardiac troponin T (cTnT), a myosin light chain (MLC), a myosin heavy chain (MHC), and connexin 43 (Cx43), without being limited thereto.

In one embodiment of the present invention, mesenchymal stem cells were cultured in a glucose-free medium, a medium containing apicidin or a medium containing apicidin and lactic acid. Then, it was confirmed whether mesenchymal stem cells were differentiated. As a result, cells differentiated by the method of inducing differentiation according to the present invention exhibited cardiomyocyte-specific gene expression.

Accordingly, the method of differentiating mesenchymal stem cells into cardiomyocytes according to the present invention may be used for various purposes in which cardiomyocytes are required.

In addition, the present invention provides a composition for inducing differentiation of mesenchymal stem cells into cardiomyocytes, containing apicidin and not containing glucose.

As described above, the composition may further include lactic acid.

In addition, the present invention provides a cell therapeutic agent for treating cardiovascular diseases including cardiomyocytes differentiated from mesenchymal stem cells by the method as an active ingredient.

As used herein, the term "cell therapeutic agent" refers to a drug that restores the functions of cells and tissues for the purpose of treatment, diagnosis and prevention of a specific disease, and may be prepared by proliferating cells in vitro, selecting cells having specific characteristics, or varying the biological characteristics of the cells using various methods.

In the present invention, the cardiovascular diseases may be angina pectoris, myocardial infarction, ischemic heart diseases, hyperlipidemia, stroke, arteriosclerosis, hypertension, arrhythmia, cerebrovascular diseases, or coronary artery diseases, preferably myocardial infarction.

The cell therapeutic agent of the present invention may further include components such as conventional therapeutic active ingredients, other adjuvants, and pharmaceutically acceptable carriers. Herein, the pharmaceutically acceptable carrier may include those conventionally used during preparation, including saline, sterilized water, Ringer's solution, buffered saline, cyclodextrin, a dextrose solution, a maltodextrin solution, glycerol, ethanol, liposomes, and the like, without being limited thereto and may further include other conventional additives such as an antioxidant and a buffer as needed. In addition, the cell therapeutic agent may be formulated into injectable formulations such as aqueous solutions, suspensions, and emulsions, pills, capsules, granules or tablets by additionally adding diluents, dispersants, surfactants, binders, and lubricants. Suitable pharmaceutically acceptable carriers may be suitably formulated according to the respective ingredients using the methods disclosed in the Remington's reference (Remington's Pharmaceutical Science, Mack Publishing Company, Easton PA). The pharmaceutical composition of the present invention may be formulated into injections, inhalants, external preparations for skin, and the like, without being limited thereto.

As used herein, the term "treatment" refers to any action that improves or alleviates the symptoms of heart diseases by administration of the composition of the present invention.

In another aspect of the present invention, the present invention provides a method of treating cardiovascular diseases, the method including a step of administering the cell therapeutic agent to an individual.

In the present invention, "individuals" refer to subjects in need of treatment for diseases, and more specifically refer to humans or non-human primates, and mammals such as mice, rats, dogs, cats, horses, and cows In addition, the present invention provides a use for preventing or treating cardiovascular diseases, including the cell therapeutic agent.

Hereinafter, preferred embodiments of the present invention will be described to facilitate understanding of the present invention. However, the following examples are provided only for the purpose of easier understanding of the present invention, and the present invention is not limited by the following examples.

EXAMPLES

Example 1. Experimental Preparation and Experimental Methods

1-1. Isolation and Culture of Mesenchymal Stem Cells

Bone marrow collected from humans was mixed with phosphate buffered saline (PBS) at a volume ratio of 1:1, diluted, and layered on a Ficoll-Hypaque solution (Ficoll-Hypaque, density: 1.077 g/mL, Sigma). At this time, the Ficoll-Hypaque solution was allowed to reach room temperature before use, and the volume of the diluted bone marrow was adjusted so that it did not exceed 3 times the volume of the Ficoll-Hypaque solution. Bone marrow layered on the Ficoll-Hypaque solution was subjected to centrifugation at 2,000 rpm for 30 minutes at room temperature to separate a red blood cell layer, a mononuclear cell layer, and a serum layer. Only the mononuclear cell layer was transferred to a new tube using a pasteur pipette, and washed with PBS to remove the Ficoll-Hypaque solution incorporated upon collecting the mononuclear cell layer and contaminated platelets.

To isolate mesenchymal stem cells from mononuclear cells and amplify the isolated mesenchymal stem cells, mononuclear cells were inoculated into low glucose DMEM (Dulbecco's Modified Eagle's Medium, Invitrogen-Gibco) containing 10% fetal bovine serum (FBS), 100 units/mL penicillin (Invitrogen-Gibco), and 100 µM/mL streptomycin (Invitrogen-Gibco) at a cell density of 1 to $2\times10^5$ cells/cm$^2$. After 2 to 3 days, non-adherent cells were removed, and monolayer culture was carried out for 2 to 3 weeks to isolate and culture mesenchymal stem cells.

Thereafter, the human telomerase gene was introduced into the isolated human bone marrow-derived mesenchymal stem cells using a lentivirus, and cell lines expressing the telomerase gene stably and continuously were selected to construct cell lines. In the case of primary cultured cells, the lifespan of cells is limited, and as subculture is repeated, cell growth ability and inherent characteristics of cells are changed. Therefore, by introducing the telomerase gene, human bone marrow-derived mesenchymal stem cells, which retain inherent characteristics such as differentiation ability and are immortalized, were established

1-2. Confirmation of Cell Viability

Figure 1:
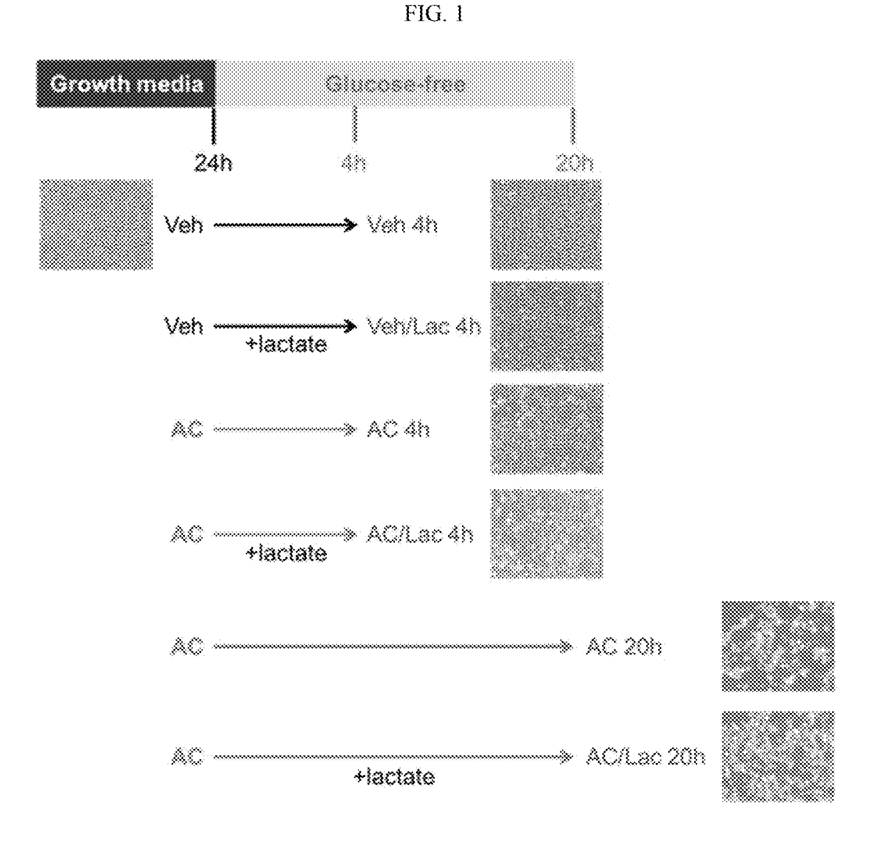
FIG. 1 is a schematic diagram explaining glucose deprivation conditions used in the present invention.

To confirm the status changes of mesenchymal stem cells in glucose deprivation conditions, an existing culture medium was replaced with a glucose-free medium, and then cells were observed after a certain period of time. At this time, cells treated with glucose or lactic acid (the case of cells incubated in a glucose-free medium, the case of cells incubated in a glucose-free medium containing lactic acid, the case of cells incubated in a glucose-free medium containing apicidin, or the case of cells incubated in a glucose-free medium containing lactic acid and apicidin) were observed, and the results are shown in FIG. 1.

First, mesenchymal stem cells were cultured in a 6-well plate filled with high glucose DMEM (4 mM L-glutamine, 4500 mg/L glucose, sodium pyruvate, 10% FBS, 100 U/ml penicillin, 100 µg/ml streptomycin) for one day. After culture, the high glucose DMEM was removed, the mesenchymal stem cells were washed twice with a sterile phosphate-saline buffer solution, and a glucose-free medium was added to the mesenchymal stem cells. At this time, the case of cells incubated in a glucose-free medium, the case of cells incubated in a glucose-free medium containing 3 µM apicidin, and the case of cells incubated in a glucose-free medium containing 3 µM apicidin and 12 mM lactic acid are denoted as Veh, AC, and AC/Lac12, respectively. At 4, 7, 20, and 27 hours after incubation, the morphology of the cells was observed under a microscope and images were obtained.

1-3. Quantitative Real-Time Polymerase Chain Reaction (qRT-PCR)

To determine the degree of differentiation of mesenchymal stem cells into cardiomyocytes by addition of apicidin and lactic acid under glucose deprivation conditions, the expression levels of cardiomyocyte-specific genes were quantitatively analyzed in the cells. More specifically, as in the method of Example 1-2, mesenchymal stem cells were incubated in each of the media for 4 or 20 hours. After incubation, the medium was removed from each sample, followed by washing once with PBS. Then, the mesenchymal stem cells were treated with TRIzol and incubated at room temperature for 10 minutes for cell lysis, and then chloroform was added thereto, followed by centrifugation. A supernatant obtained as a result of centrifugation was recovered, and total RNA was extracted. cDNA was synthesized from the total RNA using a reverse transcriptase (MMLV). Real-time PCR was performed using the synthesized cDNA as a template using a QuantiTect SYBR Green PCR kit to determine the expression levels of cardiomyocyte-specific marker genes (GATA4, Nkx2.5, and cTnI).

1-4. Immunocytochemistry Analysis

To confirm the expression of cardiomyocyte-specific marker proteins, immunocytochemistry was performed. First, mesenchymal stem cells were inoculated into a 12-well plate filled with a high glucose DMEM medium and cultured for 1 day. Then, the mesenchymal stem cells were incubated into a glucose-free medium (Veh), a glucose-free medium containing apicidin (AC), or a glucose-free medium containing apicidin and lactic acid (AC/Lac) for 4 hours. After incubation, the cell culture medium was removed from each sample, the mesenchymal stem cells were washed once with PBS, and subsequently the cells were fixed with 3.7% formaldehyde for 15 minutes, followed by treatment with 0.1% Triton X-100 for cell permeabilization. Normal goat serum was added and incubated for 1 hour to reduce background noise. Primary antibodies such as anti-GATA4 antibodies, anti-cTnI antibodies or anti-alpha-sarcomeric actin (a-SA) antibodies were added to the samples, followed by incubation at 4° C. overnight. Then, secondary antibodies labeled with a fluorescent dye (Alexa 488 or Alexa 594) were added, followed by incubation for 1 hour. Nuclei were stained with 4',6-diamidino-2-phenylindole (DAPI), a fluorescent dye. The samples were mounted on slide glass for observation using a fluorescence microscope.

1-5. (In Vivo) Animal Model

All experimental procedures for animal studies were approved by the Experimental Animal Care Committee of the Chonnam National University Medical School and were carried out in accordance with the guidelines and coordination of the Committee on Animal Protection.

First, nude mice (8 weeks old, male), which are immunodeficient mice, were used as an animal model of myocardial infarction. To induce myocardial infarction, surgery for obstructing the left anterior descending (LAD) coronary artery was performed. After anesthesia with ketamine (50 mg/kg) and xylazine (5 mg/kg), the mice breathed 95% $O_2$ and 5% $CO_2$ using an oxygenator. A retractor was inserted between the third and fourth ribs for fixing thereof. The chest was opened and the proximal portion of the left coronary artery under the left atrial appendage was wrapped with a 7-0 silk suture, the skin was sutured with a 5-0 silk suture, and the suture site was disinfected.

Immediately after myocardial infarction, mesenchymal stem cells incubated in a glucose-free medium for 20 hours or mesenchymal stem cells incubated in a glucose-free medium containing apicidin for 20 hours were labeled with DAPI, a fluorescent marker dye, for cell transplantation. For cell transplantation, a sterile DAPI solution was first added to the cell culture medium to a final concentration of 50 μg/ml, followed by washing four times with PBS. Then, cells from each experimental group were suspended in 30 μl of PBS ($3 \times 10^5$ cells) and the prepared cells were injected from the myocardial infarction zone to the marginal zone using a 30-gauge needle. After 2 weeks of cell injection, the mice were sacrificed, and the heart was harvested and frozen in liquid nitrogen. The frozen tissues were embedded using an O.C.T. compound. Cardiac tissues were sliced into 10 μm thicknesses, and immunohistochemistry staining was performed. Then, the tissues were observed at 800 magnification using a confocal fluorescence microscope.

Example 2: Protective Effect of Apicidin and Lactic Acid on Mesenchymal Stem Cells Under Glucose Deprivation Conditions To evaluate the effect of a culture medium on differentiation of mesenchymal stem cells into cardiomyocytes, as described in Example 1-2, mesenchymal stem cells were incubated in a glucose-free medium, in a glucose-free medium containing apicidin, or a glucose-free medium containing apicidin and lactic acid, and cell viability was determined.

Figure 2:
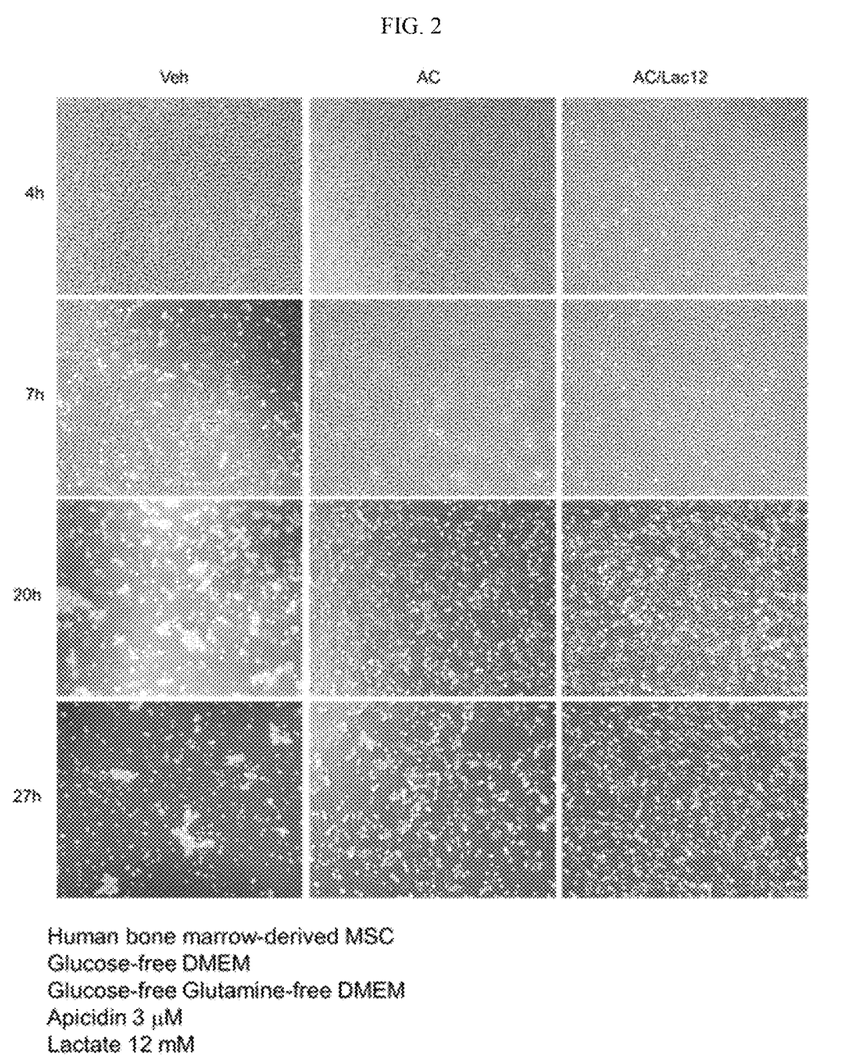
FIG. 2 includes images showing the survival rate of mesenchymal stem cells over time when mesenchymal stem cells were cultured in a glucose-free medium, a medium containing apicidin or a medium containing apicidin and lactic acid.

As a result, as shown in FIG. 2, in the case of a Veh group (mesenchymal stem cells incubated in a glucose-free medium), cell death was partially observed 7 hours later, but in the cases of an AC group (mesenchymal stem cells incubated in a glucose-free medium containing apicidin) and an AC/Lac12 group (mesenchymal stem cells incubated in a glucose-free medium containing apicidin and lactic acid), cell death was not observed. Also, at 20 hours, most mesenchymal stem cells of the Veh group had died, but in the AC group and the AC/Lac12 group, partial cell death was observed. In particular, the AC/Lac12 group exhibited excellent cell viability. At 27 hours, cell death was significantly observed in the AC group and AC/Lac12 group, but the cell survival of the AC/Lac12 group was more superior.

Example 3: Differentiation of Mesenchymal Stem Cells into Cardiomyocytes by Apicidin and Lactic Acid Under Glucose Deprivation Conditions 3-1. Increased Expression of Cardiomyocyte-Specific Marker Genes Changes in cardiomyocyte-specific gene expression by addition of apicidin or apicidin and lactic acid under glucose deprivation conditions were quantified by RT-PCR according to the method of Example 1-3.

Figure 3:
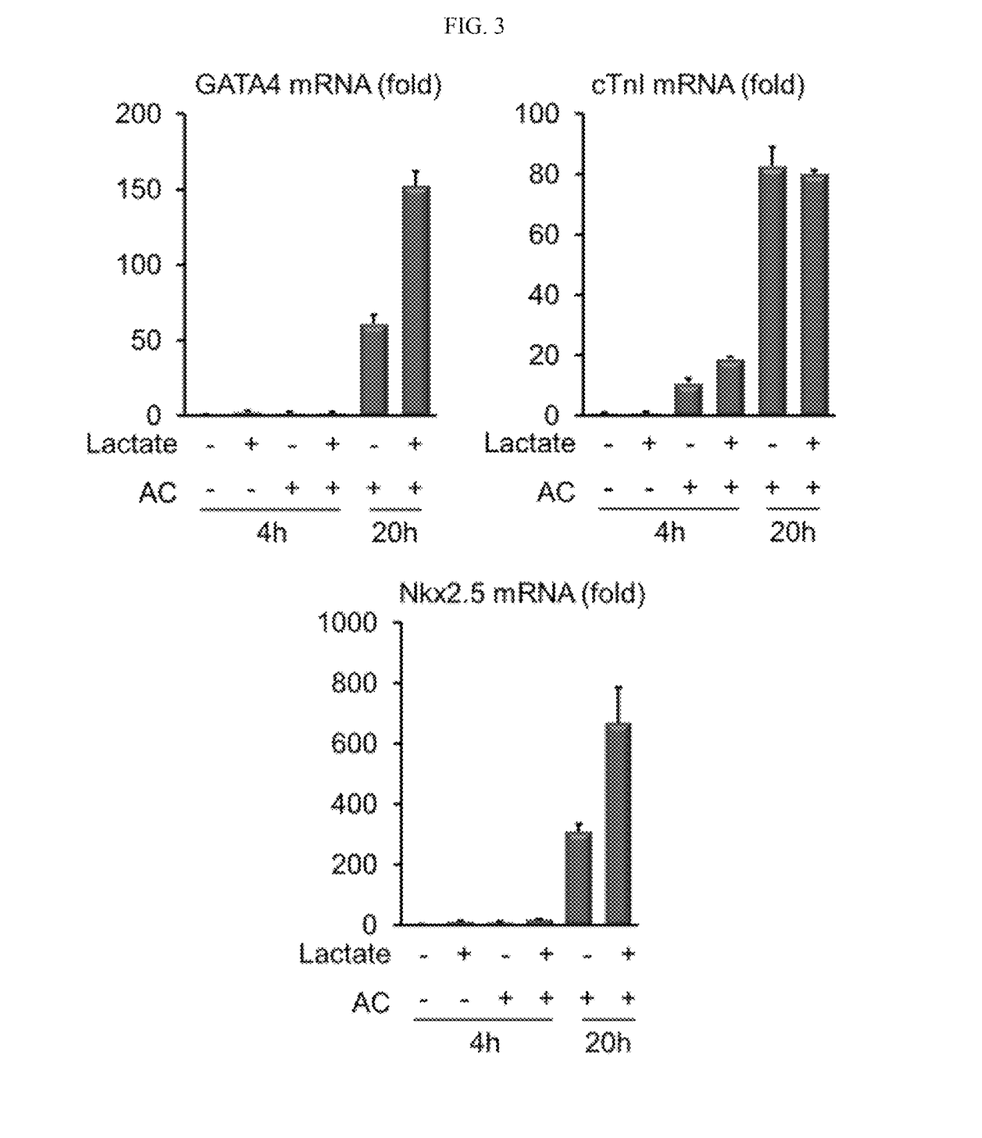
FIG. 3 includes graphs showing the expression of cardiomyocyte-specific genes such as GATA4, cardiac troponin I, and Nkx2.5 when mesenchymal stem cells were cultured in a glucose-free medium, a medium containing apicidin or a medium containing apicidin and lactic acid.

As a result, as shown in FIG. 3, intracellular gene expression of three cardiomyocyte-specific markers (GATA4, Nkx2.5, and cTnI) was significantly increased. In particular, the expression levels of the marker genes were remarkably increased at 20 hours after the treatment, and the expression of the marker genes was more increased when apicidin and lactic acid were added than when apicidin was added alone.

3-2. Increased Expression of Cardiomyocyte-Specific Marker Proteins

In addition, to confirm whether the protein expression of cardiomyocyte-specific markers was increased, immunofluorescent staining was performed according to the method of Example 1-4.

Figure 4:
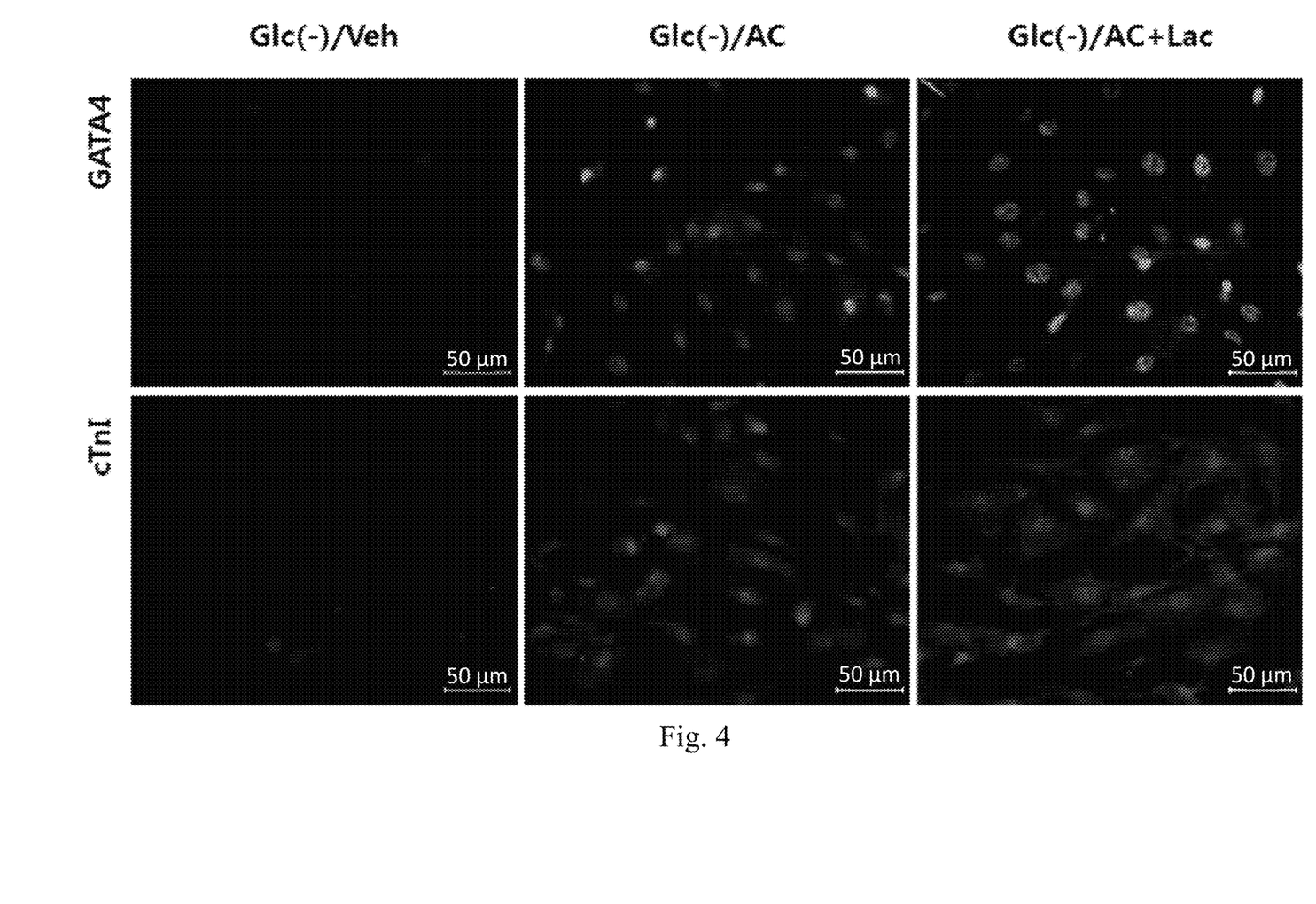
FIG. 4 includes immunofluorescent staining images confirming the protein expression of GATA-4, a cardiomyocyte-specific transcription factor, and cTnI, a myocardial structural protein, when mesenchymal stem cells were cultured in a glucose-free medium, a medium containing apicidin or a medium containing apicidin and lactic acid.

As a result, as shown in FIG. 4, the addition of apicidin alone and addition of apicidin and lactic acid, under glucose deprivation conditions, resulted in an increase in the expression of GATA4 and cTnI, cardiomyocyte-specific proteins. In particular, when apicidin and lactic acid were added together, protein expression was higher, which was the same as the result of Example 3-1. That is, in the case of the combination treatment with apicidin under glucose deprivation conditions, the protein expression of the cardiomyocyte differentiation markers was remarkably increased within a very short time.

Example 4: Confirmation of Expression of Adipocyte Differentiation Marker, Osteocyte Differentiation Marker, and Chondrocyte Differentiation Marker To further confirm whether differentiated cells had the characteristics of cardiomyocytes as confirmed by the above example, according to the method of Example 1-3, qRT-PCR was performed on the differentiated cells to compare the mRNA expression levels of PPAR-gamma as an adipocyte differentiation marker, Runx2 as an osteocyte differentiation marker, and collagen type 2a1 as a chondrocyte differentiation marker.

Figure 5:
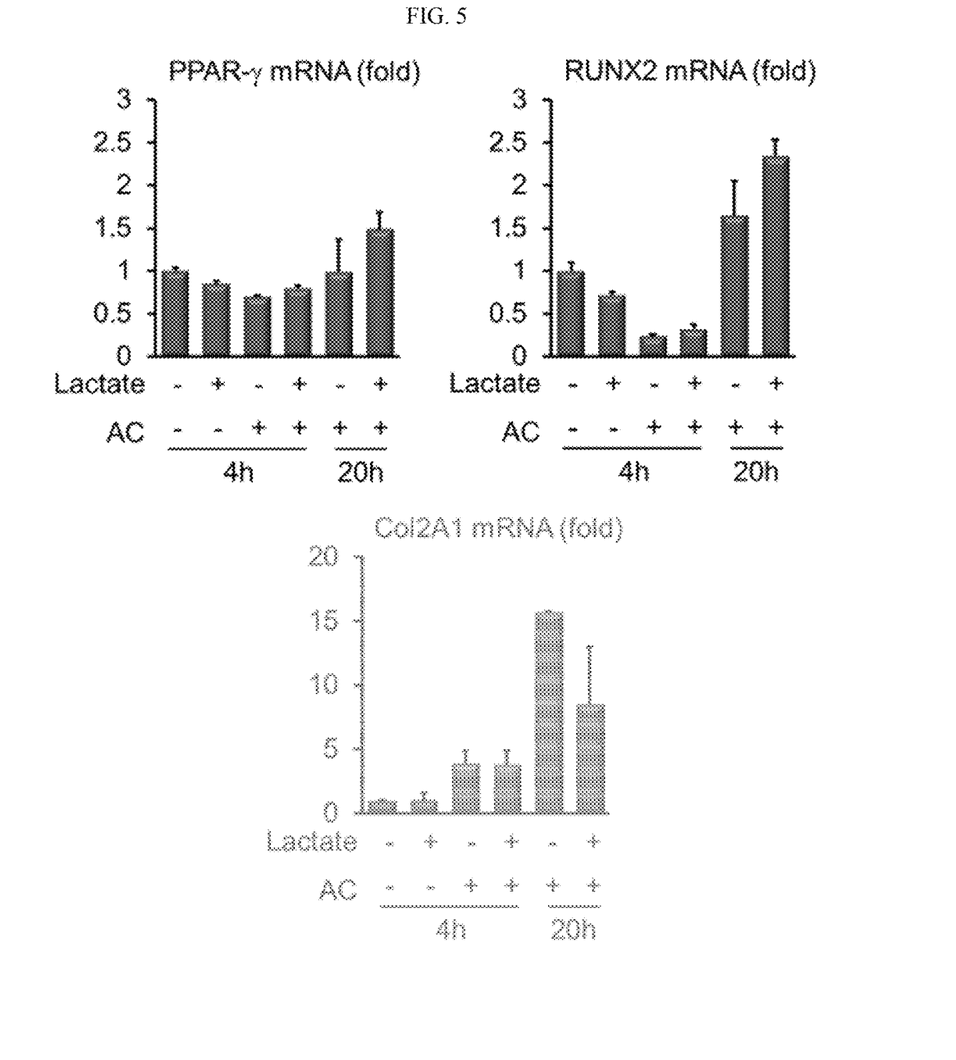
FIG. 5 includes graphs showing the expression of PPAR-gamma as an adipocyte differentiation marker, Runx2 as an osteocyte differentiation marker, and collagen type 2a1 as a chondrocyte differentiation marker, respectively.

As a result, as shown in FIG. 5, in the differentiated cells, the expression levels of PPAR-gamma as an adipocyte differentiation marker, Runx2 as an osteocyte differentiation marker, and collagen type 2a1 as a chondrocyte differentiation marker were not significantly increased or exhibited small changes.

Thus, when mesenchymal stem cells were treated with apicidin under glucose deprivation conditions, it was possible to specifically induce cardiomyocyte differentiation within a very short time. Particularly, when lactic acid was further added, the differentiation could be further improved. These results suggest that the method of the present invention may be applied to treatment using cardiomyocytes.

Example 5: Confirmation of Differentiation of Mesenchymal Stem Cells into Cardiomyocytes when Mesenchymal Stem Cells were Transplanted into (In Vivo) Myocardial Infarction-Animal Model Based on the results of the examples, to determine whether differentiation of mesenchymal stem cells into cardiomyocytes was induced in infarcted myocardium, cardiomyocyte differentiation of mesenchymal stem cells, which was identified in cell experiments using a myocardial infarction mouse animal model, was also confirmed in the myocardial tissues of experimental animals.

Figure 6:
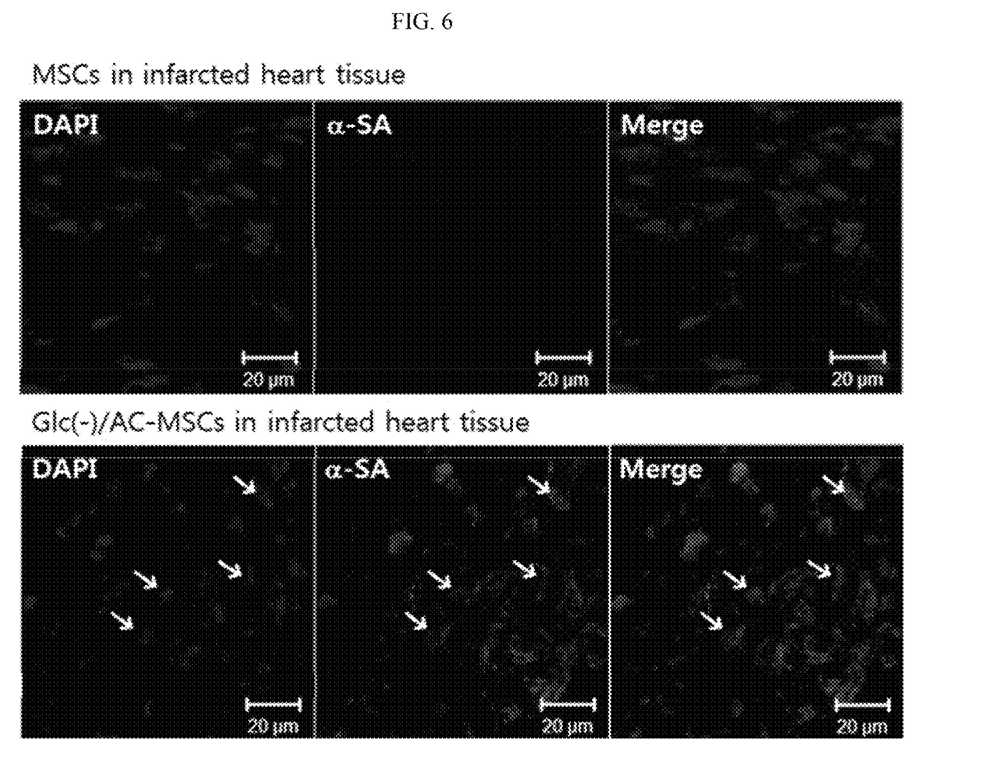
FIG. 6 includes the expression of alpha-sarcomeric actin (aSA), a cardiomyocyte-specific structural protein.

As a result, as shown in FIG. 6, the expression of alpha-sarcomeric actin (aSA), a cardiomyocyte-specific structural protein, was markedly elevated in the cardiac tissues transplanted with apicidin-treated mesenchymal stem cells (Glc (−)/AC-MSC) under glucose deprivation conditions.

These results indicate that, when apicidin-treated mesenchymal stem cells under glucose deprivation conditions are transplanted, the mesenchymal stem cells are induced to differentiate into cardiac committed cells, and differentiate into cardiomyocytes in the myocardial microenvironment after transplantation.

The present invention relates to a method of differentiating mesenchymal stem cells into cardiomyocytes. When the method of the present invention is used, cardiomyocytes can be obtained from mesenchymal stem cells with high efficiency. Therefore, the method of the present invention can be effectively used for treatment of heart diseases, such as heart failure, which requires myocardial regeneration for treatment.

The aforementioned description of the present invention is provided by way of example and those skilled in the art will understood that the present invention can be easily changed or modified into other specified forms without change or modification of the technical spirit or essential characteristics of the present invention. Therefore, it should be understood that the aforementioned examples are only provided by way of example and not provided to limit the present invention.

What is claimed is:

1. A method of inducing differentiation of mesenchymal stem cells into cardiomyocytes, the method comprising treating adult mesenchymal stem cells by culturing the adult mesenchymal stem cells in a medium consisting of glucose-free basal culture medium and apicidin or in a medium consisting of glucose-free basal culture medium, apicidin and lactic acid, wherein apicidin induces differentiation of mesenchymal stem cells into cardiomyocytes, then washing the cultured cells to produce cardiomyocytes, wherein the culturing is performed for 4 to 27 hours and wherein the expression of cardiomyocyte-specific markers is increased in the cardiomyocytes compared to the adult mesenchymal stem cells.

2. The method according to claim 1, wherein the adult mesenchymal stem cells are obtained from bone marrow, tissue, embryos, cord blood, blood or bodily fluids.

3. The method according to claim 1, wherein the cardiomyocyte-specific markers are selected from the group consisting of GATA4, Nkx2.5, cardiac troponin I (cTnI), cardiac troponin T (cTnT), a myosin light chain (MLC), a myosin heavy chain (MHC), and connexin 43 (Cx43).

4. The method according to claim 1, wherein the concentration of apicidin is 3 µM and the concentration of lactic acid is 12 mM.

5. The method according to claim 1, wherein the culturing is performed for at least 20 hours.

* * * * *